(12) United States Patent
White et al.

(10) Patent No.: US 11,181,283 B2
(45) Date of Patent: Nov. 23, 2021

(54) TEMPERATURE CONTROL SYSTEM

(71) Applicant: WARMUP PLC, London (GB)

(72) Inventors: Antony White, London (GB); Spencer Sheen, London (GB); Svetoslav Angelov, London (GB)

(73) Assignee: Warmup PLC, London (GB)

( * ) Notice: Subject to any disclaimer, the term of this patent is extended or adjusted under 35 U.S.C. 154(b) by 229 days.

(21) Appl. No.: 15/919,433

(22) Filed: Mar. 13, 2018

(65) Prior Publication Data

US 2019/0226686 A1 Jul. 25, 2019

(30) Foreign Application Priority Data

Jan. 19, 2018 (GB) .................................... 1800924

(51) Int. Cl.
  *F24D 13/02* (2006.01)
  *F24D 3/14* (2006.01)
  *F24D 3/12* (2006.01)

(52) U.S. Cl.
  CPC ............ *F24D 13/024* (2013.01); *F24D 3/122* (2013.01); *F24D 3/142* (2013.01); *F24D 2220/2081* (2013.01)

(58) Field of Classification Search
  CPC .... F24D 13/024; F24D 13/122; F24D 13/142; F24D 2220/2081
  USPC ......................................................... 237/69
  See application file for complete search history.

(56) References Cited

U.S. PATENT DOCUMENTS

| 4,250,674 A | 2/1981 | Feist |
| 4,576,221 A * | 3/1986 | Fennesz ................... F24D 3/14 165/49 |

(Continued)

FOREIGN PATENT DOCUMENTS

| CN | 106760376 A | 5/2017 |
| CN | 107013008 A | 8/2017 |

(Continued)

OTHER PUBLICATIONS

Extended European Search Report for European Patent Application No. 19152896.7, dated Jun. 28, 2019, 9 pages.

*Primary Examiner* — Allen R. B. Schult
(74) *Attorney, Agent, or Firm* — Sheppard, Mullin, Richter & Hampton LLP (57) ABSTRACT

A support structure for a heating or cooling system includes a plurality of projections designed to be capable of retaining one or more thermal elements positioned adjacent thereto. The projections are positioned so as to form a first set of substantially parallel undulating channels, each channel having one of the projections forming at least a part of the inner radius of each undulation, with each projection having a recess formed in a side wall thereof facing said channel. The undulations of the channel ensure that a thermal element positioned in the channel will make contact with the projections each time it has to bend around one, without requiring spacing of the projections to squeeze the thermal element. The thermal element can thus be held securely without any play (unwanted lateral movement) in a channel that is slightly wider than the thermal element. Recesses in the channels at the contact points also restrict movement in the vertical direction, thus preventing the thermal element from 'popping out' of the channel, while not requiring any restriction narrower than the thermal element.

19 Claims, 9 Drawing Sheets

(56) References Cited

U.S. PATENT DOCUMENTS

2009/0217605 A1   9/2009  Batori
2018/0051893 A1*  2/2018  Bordin .................... F24D 3/142

FOREIGN PATENT DOCUMENTS

| DE | 202012102478 U1 | 9/2012 |
| DE | 102016101934 A1 | 8/2017 |
| EP |       3144138 A1 | 3/2017 |
| GB |       2525936 A  | 11/2015 |

* cited by examiner

TEMPERATURE CONTROL SYSTEM

CROSS-REFERENCE TO RELATED APPLICATIONS

This application is based on and claims priority under 35 U.S.C. § 119 to United Kingdom Patent Application No. 1800924.1 filed on Jan. 1, 2018, wherein the disclosure of the foregoing application is hereby incorporated by reference herein.

TECHNICAL FIELD

The invention relates to heating and cooling systems for use within floors, walls or ceilings of buildings. In particular it may relate to underfloor heating systems in which heating is provided by heating cables or pipes fitted to a mat or panel.

BACKGROUND

Heating and cooling systems which use the floor, wall or ceiling surface as the heat exchange surface require either an embedded heat source or heat sink, commonly in the form of electrically resistive heating cables, or an embedded distribution system of pipes carrying a fluid or gas, that has been either heated or cooled by a connected heat source or heat sink. These may hereafter be referred to as the thermal element(s). While a plurality of thermal elements may be used, it is common for a single thermal element (e.g. a single cable or a single pipe) to be used. A single thermal element is typically laid in a serpentine fashion on the floor so as to distribute its heating or cooling as evenly as possible.

To ensure a regular temperature distribution of the emitting surface, it is important to space the thermal element at equidistant intervals, e.g. by looping back and forth across the emitter area.

The act of heating and/or cooling these exposed surfaces produces shear stress coplanar to the isotherms, created by the thermal element while it is active. This sheer stress can cause mechanical failure of the construction if it exceeds the limits of any individual material or bond within the system construction.

Some underfloor heating installations employ an intermediate structure fitted between a main floor and a sub-floor. The main floor is the upper structure that is presented to the user and is typically a decorative floor layer, e.g. tiles, solid wood, laminate, etc. The sub-floor is the main structural floor of the building and is typically either concrete or wood. The intermediate structure provides support for the main floor as well as providing protection for the wires or pipes which are laid therein (e.g. protection from footfall during installation and protection from crushing after installation).

Heating and cooling systems, whether electrical or hydronic (water based), need to accommodate expansion and contraction of the various structural elements of the installation. Such movement may be due to temperature variations (e.g. during start-up and cool-down of the heating elements) or due to drying out of structures after installation (e.g. drying of concrete or timber leads to shrinkage). The main area of stress in a traditional installation is between the sub-floor and the intermediate structure as this is typically where the greatest temperature difference occurs due to contact with the ground (or other surfaces), and is also where contraction due to drying will occur. Thermal stresses are dependent on the temperatures, thermal conductivities and thermal expansion coefficients.

SUMMARY

The intermediate layer, or support layer is often provided in the form of one or more mats that can be rolled out or tiled over the underlying subfloor. The support layer typically has a plurality of projections designed to be capable of retaining one or more thermal elements positioned adjacent thereto. Such structures are often referred to as castellated structures. The projections or castellations typically form a series of pillars around or between which the thermal elements are threaded, the projections providing support to hold the thermal elements in position along straight runs, but also providing support for changes of direction by winding around the projections (e.g. a 90 degree wind to change to a perpendicular direction). The projections may be spaced such that they grip the thermal elements firmly to prevent lateral as well as vertical movement, thus holding them securely in place during installation. Alternatively, the projections may be spaced sufficiently far apart that they do not laterally squeeze the thermal elements, but instead have a protuberance at the distal end of the projection that extends over the thermal elements in use and prevents them from riding up the side of the projection and potentially losing their positioning. Two such projections with protuberances may be positioned a distance apart that they will not grip the thermal elements when installed, but have their protuberances facing each other such that the distance between protuberances is less than the diameter of the thermal element. Thus the thermal elements may be squeezed or snapped into position between the projections, but will not easily squeeze back out.

While the remainder of this document discusses underfloor heating systems, it will be appreciated that the principles discussed apply equally to installations in other surfaces such as walls and ceilings. Also, fluid based systems that achieve heat exchange by flowing a liquid (typically water) through pipes can be used for cooling as well as heating. It will be appreciated that while the remainder of this document is more focused on heating installations, the principles also apply equally to cooling systems.

According to a first aspect, the invention provides a support structure for a heating or cooling system, comprising: a plurality of projections designed to be capable of retaining one or more thermal elements positioned adjacent thereto; wherein the plurality of projections are positioned so as to form a first set of substantially parallel undulating channels, each channel having one of said projections forming at least a part of the inner radius of each undulation; and wherein each projection has a recess formed in a side wall thereof facing said channel.

The undulations of the channel ensure that a thermal element positioned in the channel will make contact with the projections each time it has to bend around one, while not requiring the spacing of the projections to squeeze the thermal element. Thus the thermal element can be held securely without any play (unwanted lateral movement) in a channel that is slightly wider than the thermal element. The recesses in the channels at the contact points also restrict movement in the vertical direction, thus preventing the thermal element from 'popping out' of the channel, while not requiring any restriction narrower than the thermal element. In a traditional installation, the snap-fit mechanism uses an opening narrower than the thermal element so that the thermal element deforms to pass through the opening, then elastically returns to its normal shape and size once in the channel By contrast, with the present invention the recesses are spaced along the channel so that the thermal element is only retained by one recess at any particular point along its length. Moreover, the undulations of the channel (and thus of the thermal element within the channel) cause the thermal element to be held within the recess (and thus retained within the channel, prevented from popping out) by the natural tension of the thermal element without having to be passed through a restriction that causes deformation. This has the benefits of easing the laying of the thermal elements (less force required to push it into the channel) and less wear on the thermal element by deformation (leading to longer service life). While this wear has not generally been considered to be an issue to date, reducing or removing this installation stress should increase the service life of the product by increasing the average time to failure. As repairs can be quite disruptive, the service life is an important feature of any such system.

It will be appreciated that the recess on the projection on the inner radius of the channel may be the only recess present at that location along the channel, i.e. it is preferred that there is no recess on a projection immediately opposite, facing the channel on its outer radius (i.e. facing the outside of the curve or undulation). While the presence of such a recess is not problematic, there is no need for it as the thermal element is held in contact with the projection on its inner radius and thus held within the recess there without further aid. Particularly as the channel is preferably slightly wider than the thermal element, the outer radius on an undulation of the thermal element would not come into contact any projection present there.

The recess is preferably a dent or notch or hollow in the otherwise substantially vertical side wall of the projection. The side wall is preferably vertical for structural reasons (it is normally designed to support the weight of an installer walking on the mat, i.e. on the projections). Forming a dent or notch or hollow in the middle of the side wall (rather than for example forming an overhang at the top of the projection) is robust, retaining the structural strength of the projection (by contrast an overhang at the top may be bent or broken easily).

The undulating channels may alternatively be termed 'wavy' channels. The undulations are essentially curved zigzags back and forth from one side to the other, i.e. the channel may be considered to be formed from a series of curves in alternating directions. The curves are preferably of relatively large radius, i.e. gentle curves rather than tight curves so as to place minimal stress on the thermal elements. A large radius of curvature may be considered to be larger than the diameter of the thermal element (thus larger than the width of the channel), preferably much larger, e.g. the radius of curvature may be greater than 5 times or 10 times the diameter of the thermal element (or the width of the channel).

Preferably the projections also form a second set of undulating channels, each channel having one of said projections forming at least a part of the inner radius of each undulation. The first set of undulating channels may be substantially perpendicular to the second set of undulating channels. Such a regular array or grid of channels is useful for laying the thermal elements therein in a pattern that achieves good coverage of the surface (e.g. floor) so as to provide good even heating or cooling of the surface across the required area. Preferably the first and second sets of undulating channels together encompass a regular rectangular grid. In other words a rectangular grid (a virtual one) could be drawn entirely within the channels (including both the first and second sets) without intersecting any of the projections, the grid being rectangular and regular, for example a square grid in particularly preferred symmetrical embodiments. This requirement places a restriction on the amount of undulation in the channels as the amplitude of the undulations cannot exceed the width of the channel without crossing (blocking) the virtual grid. It also places an overall straightness restriction on the channels such that on average they follow the straight lines of the grid. This is convenient for regular patterns of laying thermal elements and is useful for matching the geometry of most rooms (most rooms being generally rectangular or at least with perpendicular walls. It will also be appreciated that the amplitude of the undulations is preferably greater than the difference between the width of the channel and the diameter of the thermal element as if this is not the case then the thermal element may not be constrained to undulate with the channel but could instead take a straight path down the middle, avoiding contact with the projections. It is further preferred that the amplitude of the undulations is less than 30% of the wavelength of the undulations, more preferably less than 10% of the wavelength of the undulations. This ensures that the increase in the required length of thermal element per unit length of the support structure is kept low. For example, with the amplitude less than 30% of the wavelength, the installed length of thermal element is no more than 1.05 meters per meter of support structure (assuming a straight run of thermal element). With the amplitude less than 10% of the wavelength, the installed length can be kept to no more than 1.005 meters per meter of support structure.

The channel may be sized appropriately for any suitable thermal elements. For example electrical heating wires may be narrower than fluid-carrying conduits (hoses or pipes) and the structure can be designed and sized appropriately for different thermal elements. In some particularly preferred embodiments the channel is sized to accommodate a thermal element with a diameter at least 2 mm.

It is preferred to design the projections and the channels for minimal contact between the projections and the thermal element beyond what is required for retaining the thermal element securely. In use, after the thermal element has been laid in the channels, an adhesive compound (e.g. a tile adhesive) is poured aver the structure so as to fill the gaps in the channels and surround the thermal element and thereby assist in conduction and distribution of heat from the thermal element to the overlying surface. The projections are typically hollow (typically moulded or vacuum formed) and thus do not contain a heat conductive substance and instead provide an insulating volume. Therefore contact between the thermal element and the projection is preferably minimized so as to improve overall heat conduction.

It is possible for a large projection to extend between adjacent channels and to have two recesses, one on each of two opposite sides (or indeed four recesses on four sides, each facing one channel). However such large projections can result in large areas without thermally conductive filler (e.g. tile adhesive) and thus can negatively impact thermal distribution. Therefore in preferred embodiments the projections are grouped into pairs, the recesses of the two projections facing adjacent undulating channels of either the first set of channels or the second set of channels. Each pair of projections is preferably two distinct projections with a gap between them through which filler material can flow and through which thermal energy can be transmitted so as to improve thermal distribution to the areas between adjacent channels (i.e. intermediate between two thermal elements).

In some preferred embodiments each projection of the pair is formed as a curve, the two curves partially surrounding a central space. The outer radius of each curved projection then forms the inner radius of the undulating channel Therefore the recess is preferably formed in that outer radius to from the contact point and retaining means for a thermal element placed in the channel.

The shape of the projections has a particular benefit that in use they make essentially (or very close to) point contact with the thermal element(s) while the thermal elements are running in one of the aforementioned channels. A greater contact area will only result when a thermal element winds around a projection when changing direction (e.g. at a 90 degree bend). This reduction in contact area between the thermal elements and the support structure results in a greater area of contact between the thermal elements and thermally conductive filler that is subsequently provided around the thermal elements, e.g. adhesive or leveling compound. The thermally conductive filler conducts heat much more efficiently across the installation than material of the support structure and therefore this arrangement results in better heat transfer, fewer hot spots and cold spots, lower thermal gradients and thus lower stresses within the structure.

The open and regular grid arrangement of channels together with the low contact area achieved with the projections also ensures that there are many easy heat flow paths for heat to be conducted around the structure. The channels that are not used to accommodate thermal elements instead provide heat conduction paths around the structure.

In order to form the undulations of the channels, each pair of projections preferably forms a structure that is wider in one dimension that separates two inner channel diameters than it is in a perpendicular dimension that separates two outer channel diameters. The combined structure of the pair thus forms a bulge around which two undulating channels curve in a mirror-image manner. It will be appreciated that in other embodiments the combined structure of the pairs could be generally circular (forming two arcs of a circle, thereby still allowing thermal distribution to the middle). Alternating large radius circles and small radius circles in a chequerboard pattern could be used to form the undulating channels. However, it is preferred that the same sized projections are used throughout, i.e. that each pair of projections has essentially the same shape.

Thus in some particularly preferred embodiments each pair of projections can have one of two orientations, one orientation being a ninety degree rotation of the other orientation, and wherein the pairs are arranged on the support structure in a rectangular grid with the orientations set according to a chequerboard pattern. With this arrangement, and in particular with the generally elliptical or bulging shape described above, the same size and shape can be used for all pairs of projections, with only the orientation changing. This makes for an even pattern with more uniform thermal distribution across the whole surface (e.g. across a whole floor).

While the support structure as described above can be used on its own, attached to the underlying subfloor directly via an adhesive layer, it is preferred that the support structure further comprises a stress mitigation layer on the underside of the structure, i.e. to lie in between the support structure and the subfloor. Thus it will be appreciated that the stress mitigation layer is provided on the side opposite the castellations. The stress mitigation layer accommodates the differences in thermal expansion coefficients between the subfloor and the support structure as well as accommodating any shrinkage during the drying out process. The stress mitigation layer may be a fabric layer (such as a fleece layer) that is designed to tear under stress, thus relieving local stress and spreading it over a larger area. Such a fabric anti-fracture layer is provided underneath the support structure and is bonded to the sub-structure. This fabric layer is designed to tear upon expansion of the support layer, relieving some of the stress while retaining adequate bonding to the sub-structure. Alternatively the stress mitigation layer may be a viscous layer that can flow and move with the surrounding structures, within its own plane, without tearing and losing contact. Any microtears are sufficiently small that they self-heal quickly once the movement has stopped.

A typical installation on a floor includes a subfloor which may be wood or concrete or may be a tile backer board. Wood and concrete are permeable, allowing moisture to escape, but a tile backer board is generally not, particularly the kinds used in wet rooms such as bathrooms or shower rooms. Above the subfloor, a layer of adhesive or a stress mitigation layer is provided, then the support structure for the thermal elements is on top of the stress mitigation layer. Tile adhesive is applied on top of the support structure and thermal elements and finally tiles or laminates are laid as the upper main floor surface.

Tile adhesives come in two different types. The first type is a dry powder to which water is added. A reaction takes place causing hardening and then the excess water typically dries out over time. The second type is a wet ready-mix which is applied straight from a tub and hardens by drying out. With the first type (dry-type) of adhesive if the water cannot escape (i.e. because there is no permeable escape route) then the water simply remains in the hardened structure with no ill effects. However with the second type (wet-type) of adhesive if the water cannot escape then the adhesive does not harden. With small tiles, there is an escape route for water through the grout between tiles, which is generally permeable. However, with larger tiles and correspondingly less grout there is insufficient area for the water to escape in a timely fashion. While the moisture will escape eventually, it will take significantly longer than the advised time (stipulated by the adhesive manufacturer) and significantly longer than is practical for installation (for example it is normally advised not to walk on the final surface until the adhesive is dry, so long drying times are inconvenient if not outright impractical. If there is no other route for water to escape then the adhesive will not harden causing installation failure. As the support structure for thermal elements is typically impermeable (typically made from plastics), this has traditionally prohibited the use of wet-type adhesives with larger tiles. The support structure is generally formed without through holes so as to prevent the tile adhesive above the structure bonding to the floor below through those holes. Such bonding would risk cracking or damage to the floor or thermal elements due to thermal expansion differences. In other words such bonding would prevent any stress mitigation layer form functioning properly to absorb or alleviate stresses. Thus the support structure has to date provided a water impermeable layer in the middle of the structure preventing any possibility of drying out of the adhesive that is provided above that structure. Thus the combination of such a structure with larger tiles or other impermeable flooring materials has meant that the wet-type adhesive cannot be used and that although the dry-type adhesive will set, it will retain the water used to make it.

In preferred embodiments of the invention the support structure comprises perforations that make the support structure breathable. In other words the perforations make the support structure permeable to water. It has been recognized that the perforations can be formed without risk of through-hole bonding. In some embodiments the support structure further comprising a fabric stress mitigation layer on the underside of the structure and the perforations penetrate through the fabric layer but have a diameter of no more than 2 mm, preferably no more than 1 mm. The small diameter of the hole(s) prevents the adhesive from above the structure (i.e. the adhesive that surrounds the thermal elements) from seeping through to the underside of the structure and creating unwanted through-bonds. The advantage of making holes through the main support structure and the stress-mitigation fabric layer is that the holes can then be formed by a straight-forward punching or drilling process after formation and cooling of the support structure. The fabric layer is typically applied to the back of the main support structure while the plastics of the main support structure is still hot so that the fabric layer (typically a polypropylene fleece layer) partially melts and adheres before cooling.

Alternatively, the structure may comprise a fabric stress mitigation layer on the underside of the structure and also comprise at least one hole through the main support structure that does not penetrate the fabric layer, said hole having a diameter of at least 3 mm, preferably at least 5 mm, more preferably at least 10 mm, and in some embodiments at least 20 mm. The larger hole(s) allows for much more efficient transport of water across the support structure. However, by ensuring that the fabric layer is not penetrated by the large hole, the adhesive on the upper side of the structure is kept separated from the subfloor by the fabric layer so that no through-bonding occurs.

With a perforation design of 3×1 mm diameter holes per pattern repeat (pair of projections) the 'specific area' of the perforations is approximately $2.5 \times 10^{-3}$ m$^2$ of hole per m$^2$ of mat (m$^2$/m$^2$).

A single 5 mm diameter hole in the center of each pattern repeat (between the pair of projections) would give a specific area of approximately $20 \times 10^{-3}$ m$^2$/m$^2$.

With a single 20 mm diameter hole in the center of each pattern repeat the specific area would be approximately $335 \times 10^{-3}$ m$^2$/m$^2$.

The large hole(s) can be formed at any point on the structure. For example, holes in the top of the projections that hold and guide the thermal elements are suitable. However, holes in the top of these projections are not aesthetically pleasing and may put off customers due to a perceived reduction in strength. Therefore as an alternative, it is preferred that the hole is formed in a separate projection. As described above, due to the bonding of the fabric layer before cooling, it is difficult to form holes in the lowest surface of the support structure (meaning the lowest surface when in use, i.e. closest to the underlying subfloor) without also perforating the fabric layer (which would risk through-bonding). Therefore forming a dedicated projection that is separated away from the fabric layer allows a post-cooling process such as punching or drilling to form the hole in the dedicated projection without contacting or breaking the fabric layer.

If the support structure is formed by moulding then it may be possible to form holes directly as part of the moulding process. However, in preferred embodiments the support structure is formed by vacuum forming. Vacuum forming does not normally lend itself to the production of holes, but in the case of the dedicated projections described above, the hole may be formed by applying a stronger vacuum in the area the dedicated projection, strong enough to tear the plastic at that point thereby creating the hole as desired. The fabric layer can then still be applied during cooling as normal.

With the support structure having holes that allow water to pass through, the wet-type adhesive can be used above the support structure even with large tiles or other impermeable flooring materials as the moisture can escape down to the sub-floor which is typically concrete or wood and is permeable, thus allowing the wet-type adhesive to dry out and function properly.

The support structure may be made from a variety of materials, but is preferably a plastic material with sufficient rigidity to withstand the weight of a reasonably heavy decorative floor structure (such as stone tiles) with additional loads from normal use (furniture or people walking on top of it).

There is a general misconception amongst installers that the smooth surface of plastic support structures does not provide a good bond for the adhesive or screed poured over the top. While tests have shown that a good bond is indeed achieved, it may in some embodiments be preferred to add texture to the upper surface of the support structure so as to provide an additional key for the adhesive or screed. Preferably the surface of the projections is textured. The texture may be applied in any of a number of ways such as by moulding or surface imprinting during a vacuum forming process, or by etching or grit-blasting after formation of the main structure. One way to form the texture may be to apply fibres to the surface before cooling so that they partially melt and stick to the surface, but do not fully melt so as to leave some surface texture. The fleece fibres of the same type as the fabric stress-mitigation layer may be used. This can be particularly economical where the fleece fabric layer is also being used due to bulk buying or by using off-cuts or wastage from applying the fabric layer.

The invention also extends to a method of forming a support structure for a heating or cooling system, comprising: forming a plurality of projections designed to be capable of retaining one or more thermal elements positioned adjacent thereto; wherein the plurality of projections are positioned so as to form a first set of substantially parallel undulating channels, each channel having one of said projections forming at least a part of the inner radius of each undulation; and wherein each projection has a recess formed in a side wall thereof facing said channel.

It will be appreciated that all of the preferred and optional features described above in relation to the apparatus also apply equally to the method of making it.

The use of holes in the support structure for allowing water transfer is believed to be independently inventive. Therefore according to another aspect, there is provided a support structure for a heating or cooling system, comprising: a castellated mat having a plurality of projections on one side; and a stress mitigation layer formed on the other side of the mat; wherein the castellated mat has at least one hole therethrough that does not penetrate the stress mitigation layer.

Again, the preferred and optional features described above also apply here. Therefore the support structure preferably comprises a fabric stress mitigation layer on the underside of the structure, and the perforations may penetrate through the fabric layer but have a diameter of no more than 2 mm. Alternatively the structure may comprise at least one hole through the support structure that does not penetrate the fabric layer, said hole having a diameter of at least 3 mm, preferably at least 5 mm, preferably at least 10 mm, more preferably at least 20 mm. This hole may be formed in a separate projection.

According to another aspect, there is provided a method of forming a support structure for a heating or cooling system, comprising: forming a castellated mat having a plurality of projections on one side; and providing a stress mitigation layer on the other side of the mat; forming at least one hole through the castellated mat that does not penetrate the stress mitigation layer.

The use of a textured surface is also believed to be independently inventive. Therefore according yet another aspect, there is provided a support structure for a heating or cooling system, comprising: a castellated mat having a plurality of projections on one side; wherein the surface of the projections is textured.

Once again, the preferred and optional features described above also apply here. For example the texturing may be provided by adhering particles such as fibres, particularly fleece fibres to the surface of the mat.

According to another aspect there is provided a method of forming a support structure for a heating or cooling system, comprising: forming a castellated mat having a plurality of projections on one side; wherein the forming comprising texturing the surface of the projections.

BRIEF DESCRIPTION OF DRAWINGS

Preferred embodiments of the invention will be described, by way of example only, and with reference to the accompanying drawings in which.

DETAILED DESCRIPTION

Figure 1:
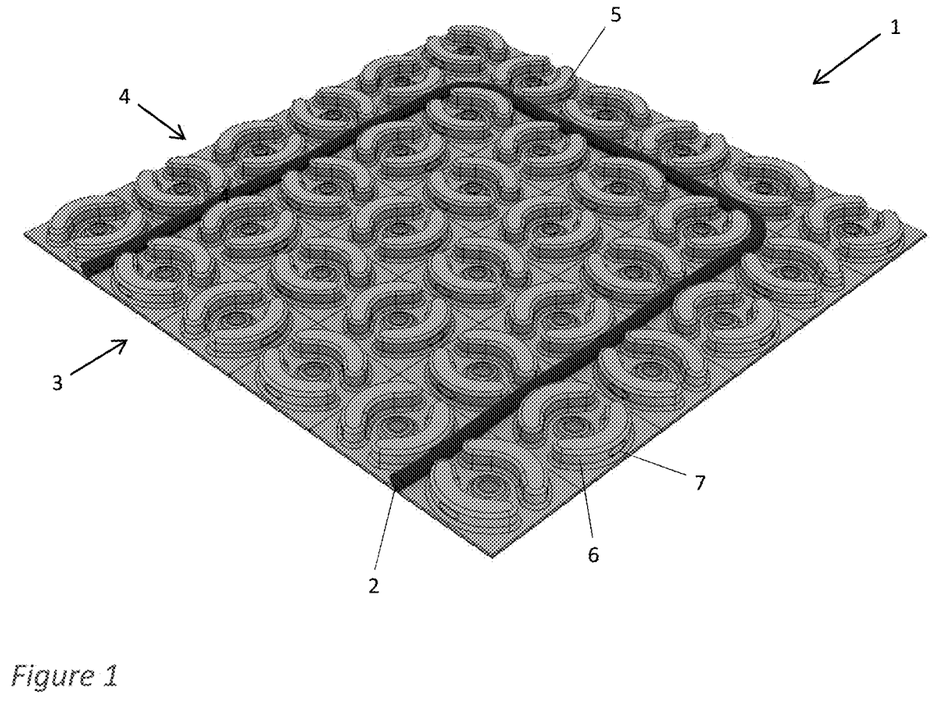
FIG. 1 shows a perspective view of a first embodiment of a castellated mat support structure;
b.
Figure 2:
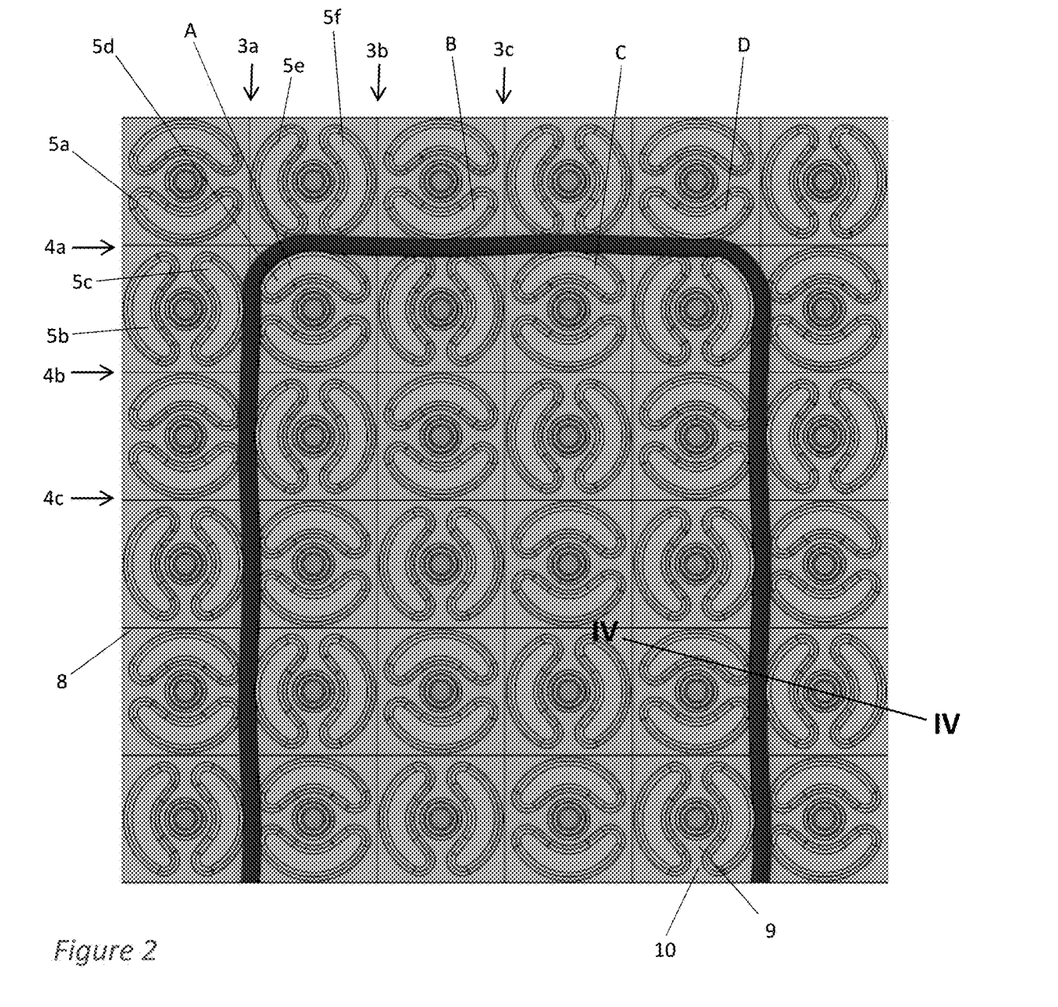
FIG. 2 shows a plan view of the mat of FIG. 1;
c.
Figure 3:
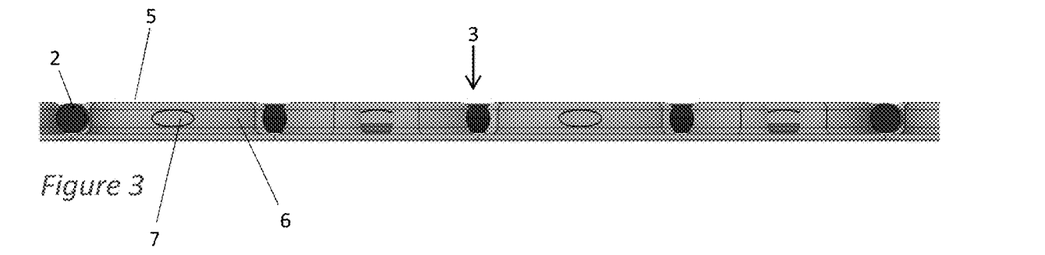
FIG. 3 shows a side view of the mat of FIG. 1;
d.

FIGS. 1-3 show a first embodiment of a castellated support structure 1 in the form of a mat. The mat may take the form of sheets that can be laid adjacent to one another or a roll that can be rolled out onto a desired surface. Either way the mat can be cut to size and shape for any particular installation.

The mat 1 is typically used as an intermediate structure in underfloor heating installations and provides a structure around which a heating element can be wound while holding the heating element in place. The mat 1 also provides a rigid structure that can protect the heating element from being damaged, e.g. crushed during installation by installers walking around on the mat 1.

While the remainder of this description discusses a heating element in an underfloor heating installation, it will be appreciated that the mat is equally useful for a cooling element such as a conduit to carry a cold fluid and absorb heat from the room. It will also be appreciated that the installation is not limited to floors, but could equally well be installed on a wall or ceiling. It will also be appreciated that underfloor heating systems can either be fluid-based (often termed hydronic) in which a hot liquid is pumped through a fluid carrying conduit, or electrical in which an electrical current is passed through a heating wire to generate heat. The mat 1 can be used for any of these installations. The heating conduit, cooling conduit or heating wire are generally referred to as a thermal element.

FIG. 1 shows a support structure (mat) 1 with a thermal element (an electrical heating wire in this particular embodiment) 2 which is flexible and which has been laid in channels 3, 4 which are formed between projections 5. The projections have a side wall 6 with a height greater than the diameter of the thermal element 2 so that the channels 3, 4 are deeper than the thermal element 2 and the thermal element 2 is thus fully accommodated in the channels 3, 4. The thermal element 2 thus lies underneath the upper surface of the mat 1 and is protected from footfall on top of the mat 1.

As can best be seen in FIG. 2, the channels 3, 4 are undulating in the sense that the constrictions that form each channel 3, 4 are not all perfectly in line, but rather are offset alternately in opposite directions when viewed along the length of the channel 3, 4. Therefore a thermal element 2 laid in the channel 3, 4 undulates back and forth across a mid-line of the channel 3, 4 as it is deflected by the projections 5 on either side of the channel 3, 4. This undulation allows the thermal element 2 to be held in contact with the side walls 6 of a number of the projections 5, but without being pinched between them and without requiring overhanging lips to hold the thermal element 2 in the channel 3, 4. Instead, the channel 3, 4 can be formed to be wider than the diameter of the thermal element 2, thus avoiding pinching, while still ensuring that the thermal element 2 is contacted on both sides thereby holding it securely within the channel 3, 4. Without such grip on both sides there is a risk that the thermal element 2 could pop out of the channel 3, 4 which is inconvenient as it requires relaying of the thermal element 2 and also risks damage to the thermal element 2 underfoot while not protected in a channel 3, 4.

For added security, i.e. for better retention of the thermal element 2 within the channel 3, 4, it is preferred that a small recess 7 is provided on the projections 5 at the point of contact with the thermal element 2. This recess ensures that as the thermal element 2 is diverted around the projection 5, it sits in the recess 7 and is thus retained from above by a part of the projection 5 that overlies the thermal element 2. Note however that as this recess 7 is only ever present on one side of the channel 3, 4 at one time and as the channel 3, 4 is wider than the thermal element 2, the thermal element 2 is not pinched as it is pressed down into the channel 3, 4 and thus does not suffer any potential damage during this process.

The portion of the thermal element 2 that lies in channel 4a in FIG. 2 is caused to undulate by four projections 5 which have been labeled A, B, C and D in FIG. 2. The projections A and C lie on one side of the thermal element 2, deflecting it in one direction (towards the top of the page), while projections B and D lie on the opposite side of the thermal element 2, deflecting it in the opposite direction (towards the bottom of the page). Therefore, with reference to the page of FIG. 2, the thermal element undulates from left to right over projection A, under projection B, over projection C and under projection D. The contact points of the projections A, C interleave with those of projections B, D along the length of the thermal element 2. It can be appreciated from this illustration that the outer radius of each projection A, B, C, D forms the inner radius of the undulations of thermal element 2 placed in channel 4a. The outer radius of the thermal element 2 does not make contact with the projections that are adjacent to it (best seen in FIG. 4).

As can be seen in FIGS. 1 and 2, two sets of undulating channels 3, 4 are formed the first set 3 is perpendicular to the second set 4. The first set of channels 3 comprises a number of substantially parallel channels, e.g. 3a, 3b, 3c. Similarly, the second set of channels 4 comprises a number of substantially parallel channels, e.g. 4a, 4b, 4c. The term "substantially" here allows for the fact that adjacent channels in a set or not exactly parallel. For example, in the design of FIGS. 1-3, the undulations in two adjacent channels 3a, 3b are a mirror image of each other such that they undulate towards and away from each other as they pass along the length of the mat, i.e. there are points in adjacent channels that are closer together than other points in the same adjacent channels. Thus the adjacent channels 3a, 3b (and also 4a, 4b or 3b, 3c or 4b, 4c) are not exactly parallel.

The two sets of channels 3, 4 together encompass a rectangular grid 8 which is shown in FIGS. 1-3 by way of illustration but need not actually take any form or be marked on the mat 1 in any way. The grid 8 is formed from straight lines at right angles to each other and illustrates the relative positioning of the projections 5 and how they form the undulating channels 3, 4. Looking at the grid line that lies in the channel 4a at the top of FIG. 2, it can be seen that the left-most projection 5a that lies above the grid line is much closer to the grid line than the two left-most projections 5b, 5c that lie below the grid line. Together these three projections 5a, 5b, 5c form the left-most constriction that defines the channel 4a. The next left-most constriction is again formed by three projections 5d, 5e, 5f, but this time projection 5d lies below the grid line while projections 5e and 5f lie above it and the projection 5d below the grid line is much closer to the grid line than the two projections 5e, 5f above it. Thus these two left-most constrictions are centered on opposite sides of the grid line and hence cause the channel 4a to undulate or oscillate along the grid line as it passes from left to right.

The projections 5 are arranged in pairs. For example projections 5b and 5c form a pair. Similarly projections 5e and 5f form a pair. Each pair of projections 5 lies between two adjacent channels of the first set of channels 3 and also between two adjacent channels of the second set of channels 4. Each projection 5 of the pair forms a contact point on a channel 3, 4 such that the two projections 5 of the pair form contact points on adjacent channels 3, 4 of one set of channels, but not both. Thus if a pair of projections 5 form contact points on a channel of the first set 3, they do not form contact points on a channel of the second set 4 and vice versa. Recesses 7 are formed at these contact points as discussed above. Each pair of projections is thus together slightly elliptical, having a wider dimension between the outer radii of the two projections 5 that form contact points with the adjacent channels (and have recesses 7 formed therein) than the dimension that does not contact the perpendicular channels.

The two projections 5 of a pair are curved such that each forms an arc around a central region 9. The two projections 5 of each pair are separated from each other so as to form a pathway 10 into the central region 9. These pathways 10 allow heat to be conducted from the thermal element 2 more evenly across the surface of the mat 1 as a whole, avoiding cold spots that might otherwise be formed between channels 3, 4. The curved nature of the projections 5 allows them to guide the thermal element smoothly between channels 3 of one set and channels 4 of the perpendicular set, thus allowing changes of direction of the thermal element 2 so that it can be laid back and forth across the mat 1 to cover a whole floor.

It may be noted that the rectangular grid 8 lies entirely within the channels 3, 4, i.e. the undulations caused by the projections 5 do not cause a thermal element 2 placed within the channel 3, 4 to deviate by more than the width of the thermal element 2. This puts a restriction on the amplitude of the undulations so as to minimize the stress placed on the thermal element 2, while also minimizing the increase in length of thermal element 2 that is required by the undulations but also ensuring that the thermal element 2 is still securely held in place.

As can best be seen in FIGS. 1 and 2, the projections 5 can be arranged into pairs in two different orientations so that one orientation provides contact points with one set of channels 3, while the other orientation provides contact points with the other set of channels 4. The projections 5 are arranged such that these two orientations are interleaved like the squares of a chequerboard, e.g. with one orientation occupying the black squares and the other orientation occupying the white squares. Thus each pair is directly adjacent (on the opposite side of a single channel) to a pair of the other orientation.

Figure 4A:
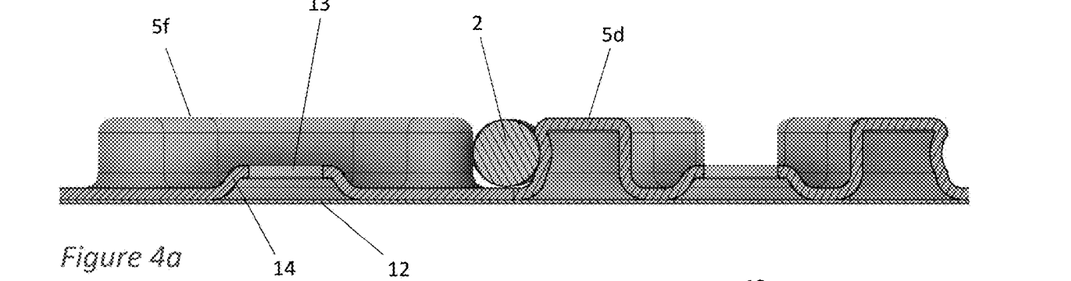
FIGS. 4a and 4b show cross-sections through a castellated mat;
e.
Figure 4B:
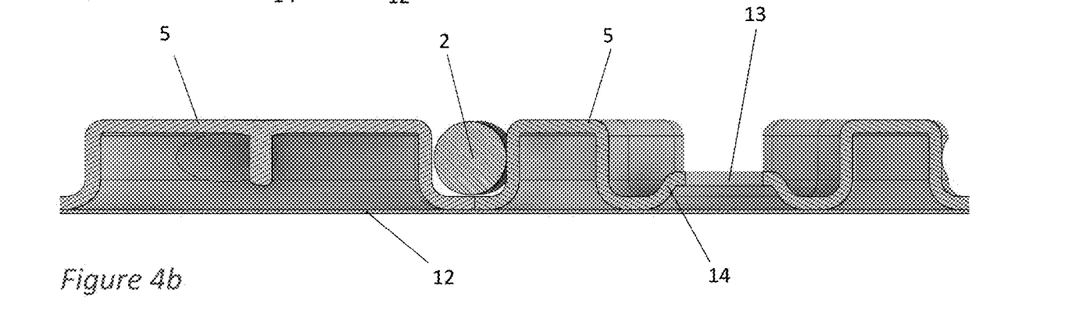

FIG. 4a shows a cross-section taken through two adjacent pairs of projections 5 and showing the thermal element 2 in contact with the projection 5d while not being in contact with the projection 5f. The thermal element 2 (e.g. heating wire) is seated in recess 7 in the outer diameter of curved projection 5d and is therefore constrained from upwards movement by the vertical overlap of the thermal element 2 and the projection 5 formed in this region. It can be seen that the thermal element 2 is not constrained by any similar overlap on the opposite side, i.e. adjacent to projection 5f. FIG. 4b shows a similar view, but taken at an angle (along the line IV-IV in FIG. 2) rather than substantially parallel to the channel 4 so as to take a section through the narrowest point of the channel between the outer radius of the large-radius part of one projection and the outer radius of the small-radius part of an adjacent projection (on the opposite side of the channel 3). It can be seen in FIG. 4b that the thermal element 2 is narrower than this narrowest part of the channel, i.e. the thermal element 2 is in contact with the large radius of the projection on the right, but there is a gap between the thermal element 2 and the small radius of the projection on the left.

Figure 5:
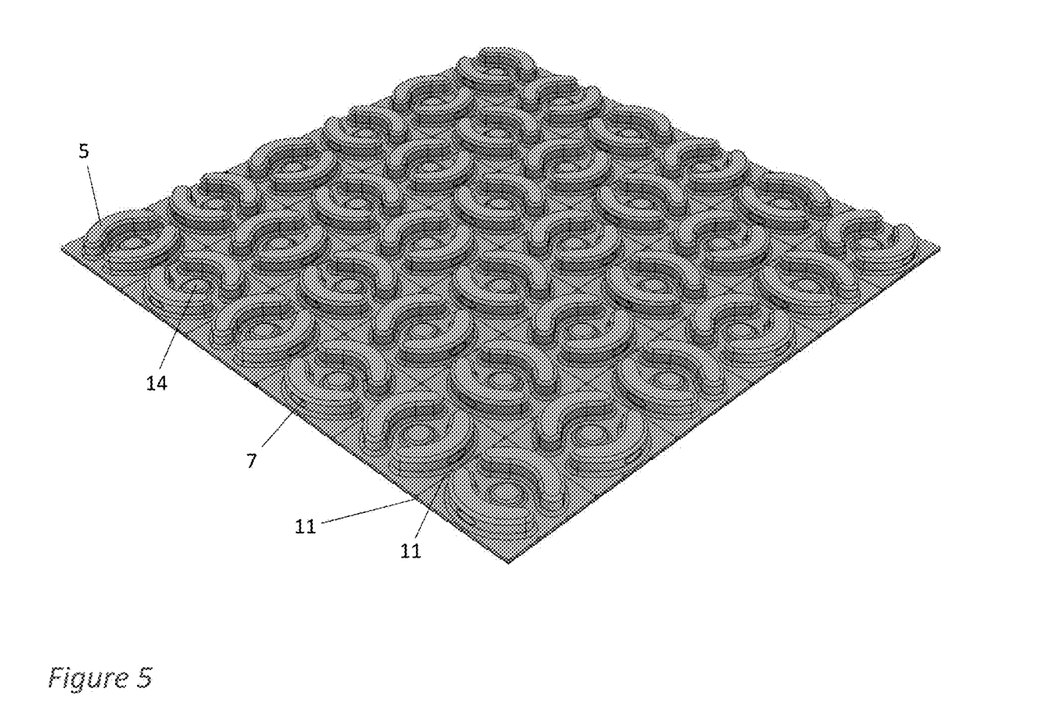
FIG. 5 shows a perspective view of a second embodiment of a castellated mat support structure;
f.
Figure 6:
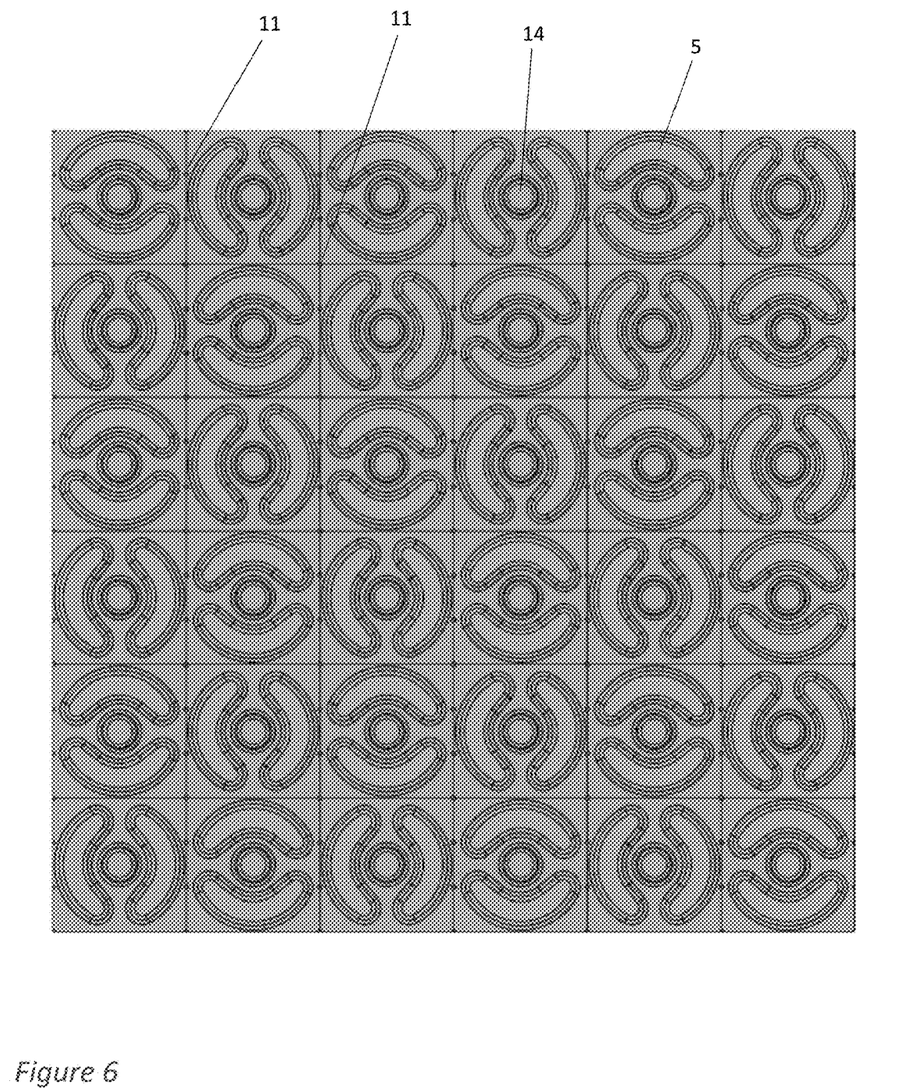
FIG. 6 shows a plan view of the mat of FIG. 5;
g.
Figure 7:
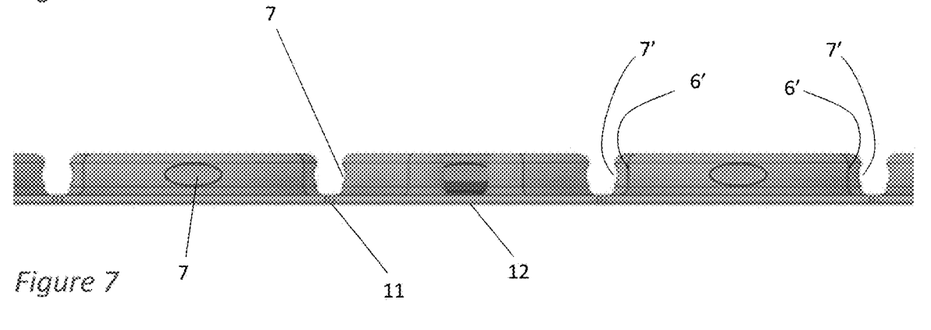
FIG. 7 shows a side view of the mat of FIG. 5;
h.

FIGS. 5-7 are similar to FIGS. 1-3, except that for clarity the thermal element 2 is not shown in these figures. FIG. 7 is a side view looking down the length of channels 3. It will be appreciated that from this viewpoint two rows of pairs of projections can be seen, one behind the other. The wider dimension of a pair of projections in the rear row can be seen extending out beyond the narrower dimension of a pair of projections in the front row. This is highlighted on the right hand side of FIG. 7 where reference numeral 6' shows the vertical side wall of the projection in the front row, while reference number 7' shows the recess in the side wall of the projection in the rear row. It can clearly be seen that the width of the projection 5 between side walls 6' in front is less than the distance between the recesses 7' of the pair of projections behind. FIGS. 5-7 also show perforations 11 that are formed through the support structure 1 so as to provide a liquid transfer path from one side to the other of the support structure 1. These perforations 11 allow any adhesive that is applied above the support structure 1 to dry out by losing moisture through the perforations 11. As in existing installations, any evaporation path that allows moisture to escape upwards, e.g. between tiles, is still viable.

However, the perforations 11 allow wet-type adhesives to be used even when there is no (or there is insufficient) moisture escape route upwards from the support structure. Instead, moisture can escape by travelling across the membrane support structure 1 from a top side (tile side or floor side) to the bottom side (sub-floor side) and can escape through normal moisture escape paths e.g. through a wooden or concrete sub-floor structure.

The perforations 11 are formed in the structure 1 by punching or drilling through the finished structure. Thus the perforations 11 are formed through the support structure 1 itself as well as through any stress mitigation layer formed on the underside thereof (as best seen in FIG. 7). For example where a fabric layer such as a fleece layer 12 is formed on the back of the support structure 1, the perforations pass through the support structure 1 (typically plastic) and through the fabric layer 12. The diameter of the perforations 11 is kept sufficiently small that these through-holes do not allow adhesive to pass through from the top to the bottom and form a rigid connection across the support structure 1. Such a rigid connection would prevent the stress-mitigation layer from accommodating relative movement of the support structure 1 and the sub-floor, e.g. due to thermal expansion variations. The perforations are no more than 2 mm in diameter to ensure no such rigid connection.

As is shown in FIGS. 5-7, numerous perforations may be used to make up for their small size, regularly distributed across the surface of the support structure 1. In the embodiment of FIGS. 5-7 the perforations are formed along one set of channels 3 at a rate of three perforations per pair of projections 5 (i.e. two perforations between each perpendicular channel of the second set 4 and one on the intersection of perpendicular channels). However, it will be appreciated that this is purely an example and any other number and/or arrangement of perforations could equally well be used.

Figure 8:
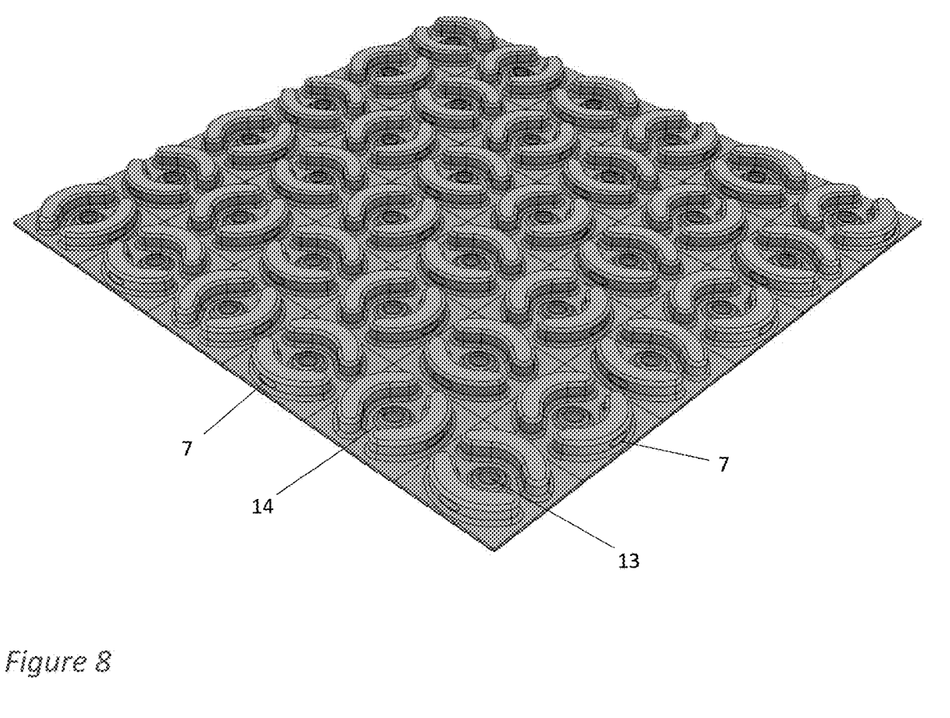
FIG. 8 shows a perspective view of a third embodiment of a castellated mat support structure;
i.
Figure 9:
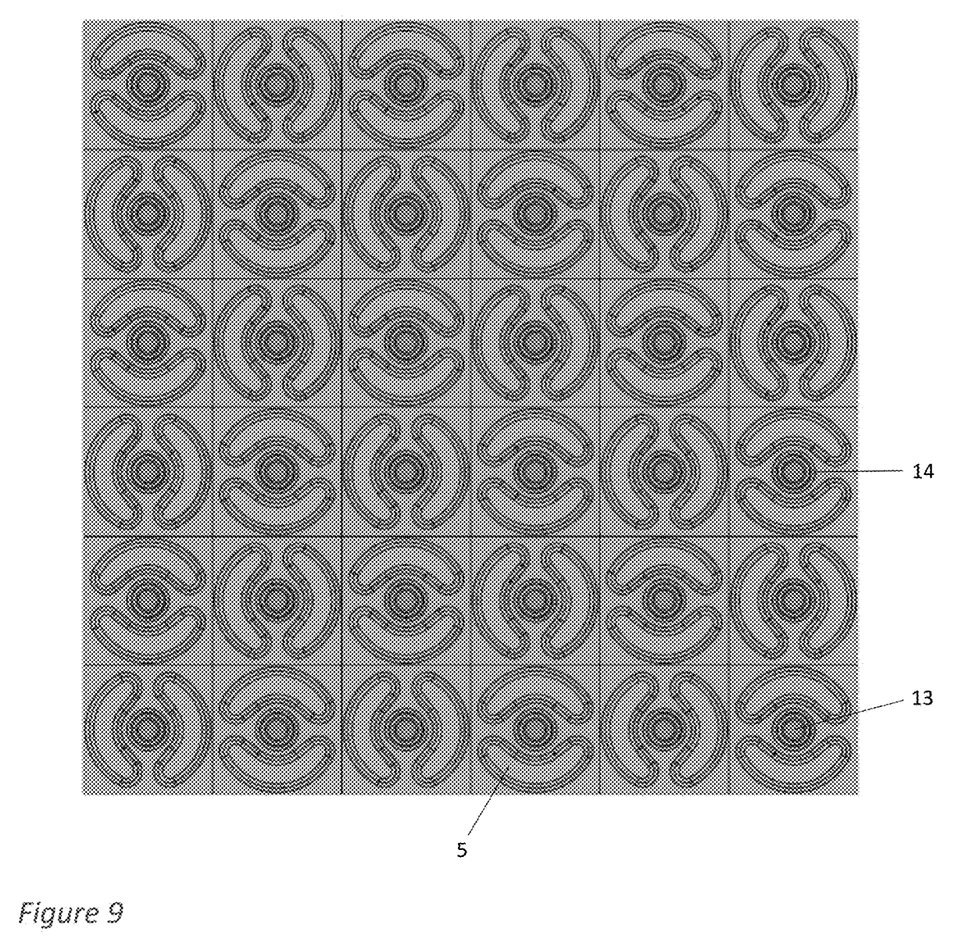
FIG. 9 shows a plan view of the mat of FIG. 8;
j.
Figure 10:
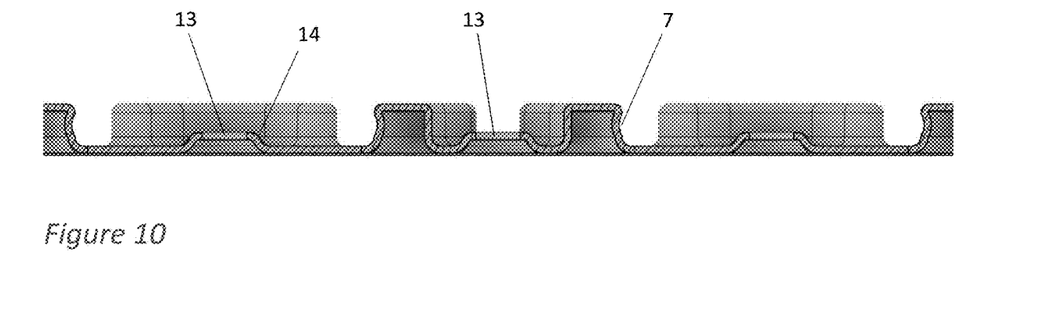
FIG. 10 shows a side view of the mat of FIG. 8;
k.

FIGS. 8-10 are similar to FIGS. 1-3, except that for clarity the thermal element 2 is not shown in these figures. Also, FIG. 10 is a cross-section through the support structure 1 rather than a side view as this better shows the construction. The different hatchings on the cross-section illustrate the different pairs of projections (the different orientations being represented by different hatching).

FIGS. 8-10 illustrate an alternative to FIGS. 5-7 (although the two techniques could be used together) which uses larger holes 13 for transferring moisture from one side of the support structure 1 to the other side. The larger holes 13 can have a larger area than the perforations 11 and can thus allow a faster rate of moisture transfer across the structure 1. However, a larger area hole means that there is a risk of adhesive bonding across the structure 1 which could prevent the stress-mitigation layer from operating correctly. Thus the larger holes 13 are formed only through the support structure 1 and not through the stress mitigation layer 12 (in this embodiment a fabric (fleece) layer bonded to the underside of the support structure 1). As the stress mitigation layer 12 remains unbroken, adhesive from the upper side of the structure 1 is prevented from bonding to the underlying sub-floor and thus the stress-mitigation layer remains in place to accommodate relative movement due to differing thermal expansion.

In order to allow the holes 13 to be formed without damage to the stress mitigation layer 12, the holes 13 are formed in projections 14 which project away from the stress mitigation layer 12. As a gap is present between the upper surface of the projection 14 and the stress mitigation layer 12, it is easy to cut, drill or otherwise rupture the top of the projection 14 without at the same time damaging the stress mitigation layer 12. In this embodiment the projection 14 is a separate projection formed in the central area 9 between each pair of projections 5, i.e. one such projection 14 can be formed for every two projections 5 on the mat 1.

In use, when adhesive is applied to the upper surface of the support structure 1, the adhesive can flow through the holes 13 where it collects between the stress mitigation layer 12 and the underside of the projection 14. This has an additional benefit of providing a good bond between the adhesive layer and the support structure 1.

Figure 11:
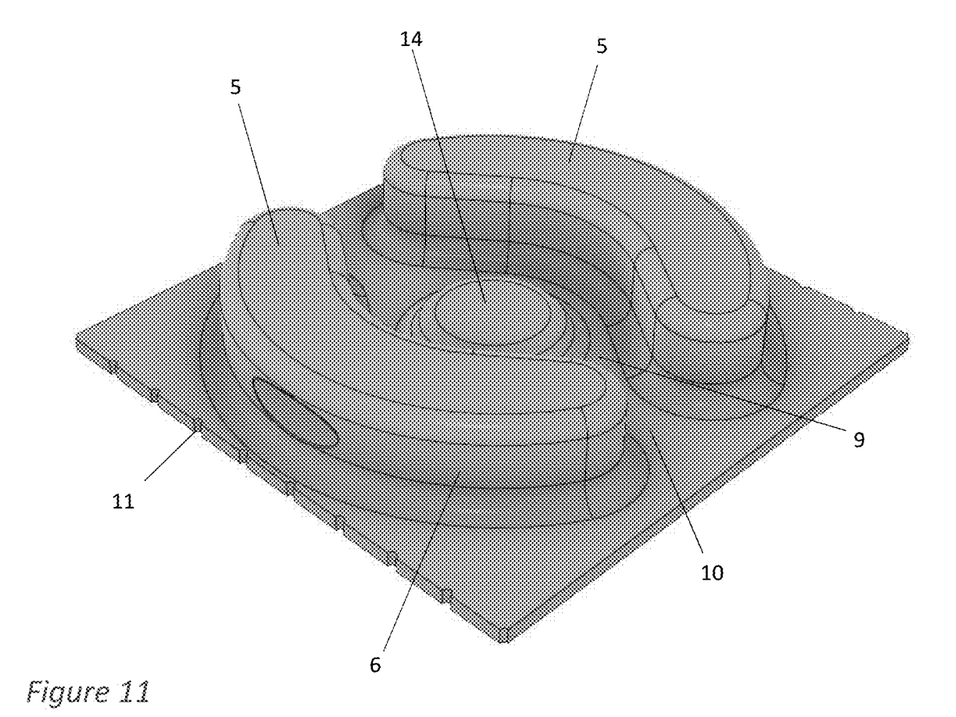
FIG. 11 shows a pair of main projections with a central additional projection;
l.
Figure 12:
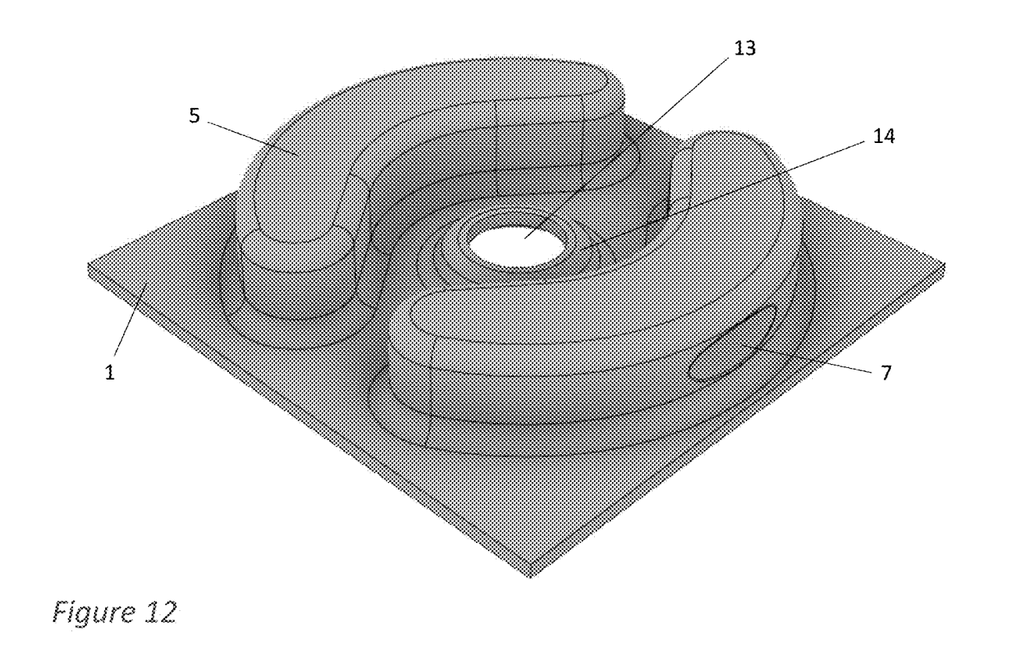
FIG. 12 shows the structure of FIG. 11 with a hole formed through the additional projection;
m.
Figure 13:
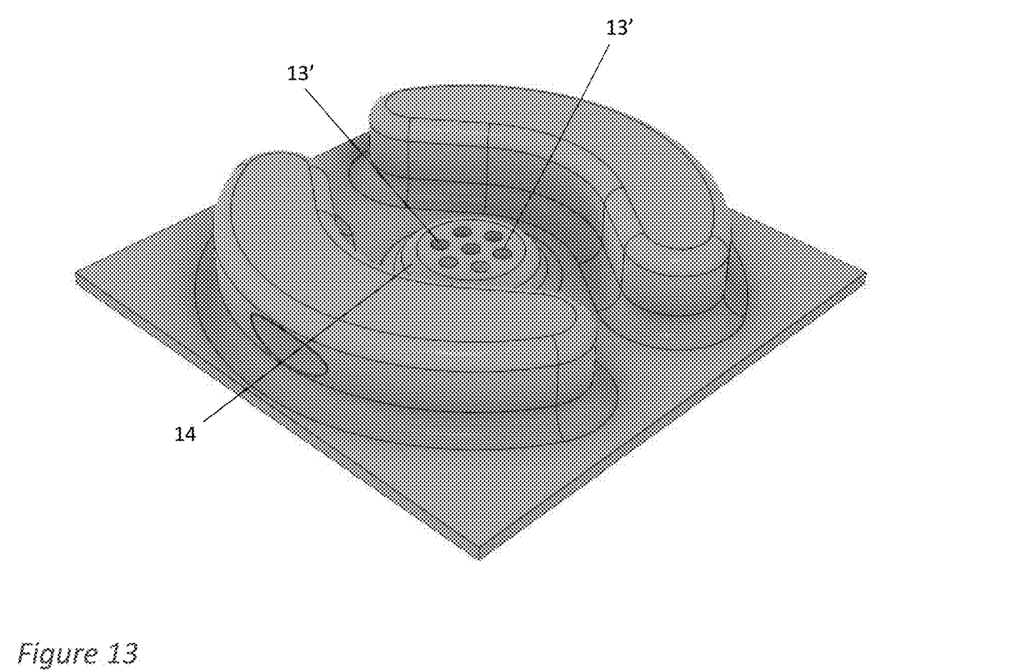
FIG. 13 shows an alternative to FIG. 12 with multiple holes formed through the additional projection;
n.

FIG. 11 shows a close up of a pair of projections 5 with perforations 11 formed in the support structure 1. FIG. 12 shows a close up of a pair of projections 5 with an additional projection 14 and hole 13 formed therein. FIG. 13 shows an alternative version of FIG. 12 where instead of a single hole 13, a plurality of smaller holes 13' are formed.

Figure 14:
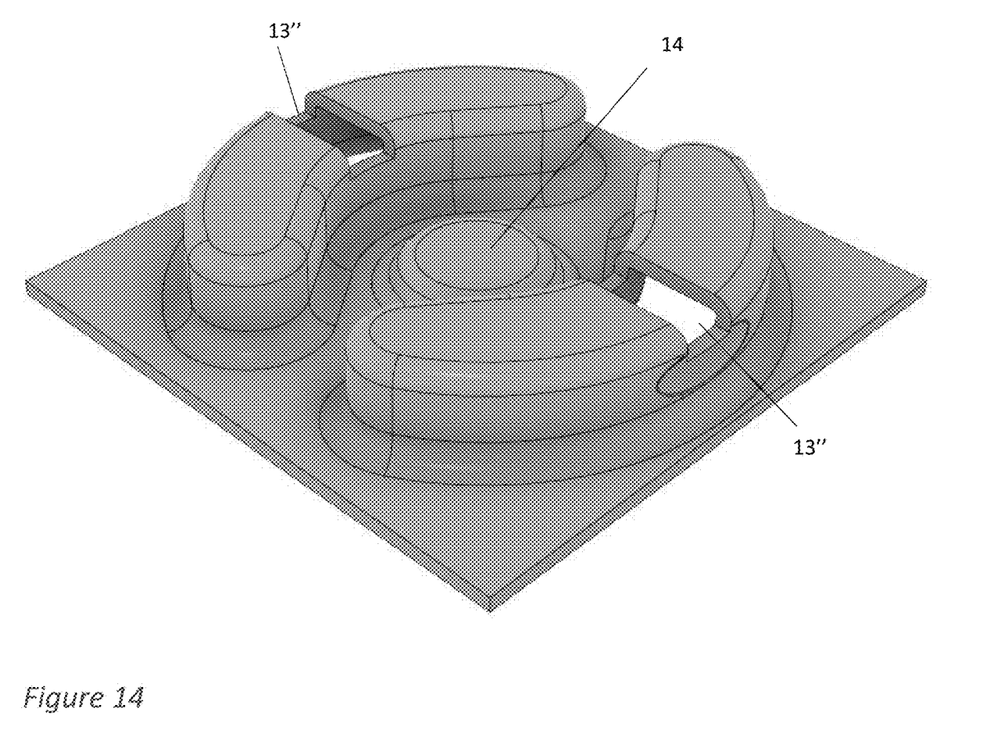
FIG. 14 shows an alternative structure with projection through-holes;
o.

FIG. 14 shows another alternative to FIGS. 12 and 13. Instead of forming the hole 13 (or holes 13') in a dedicated projection, holes 13" are formed in the tops of the main projections 5. These holes 13" can be formed particularly quickly and easily for example by cutting across the mat 1 after forming. However, the end result, while perfectly practical, is less aesthetically pleasing and for this reason may be less preferred.

Figure 15:
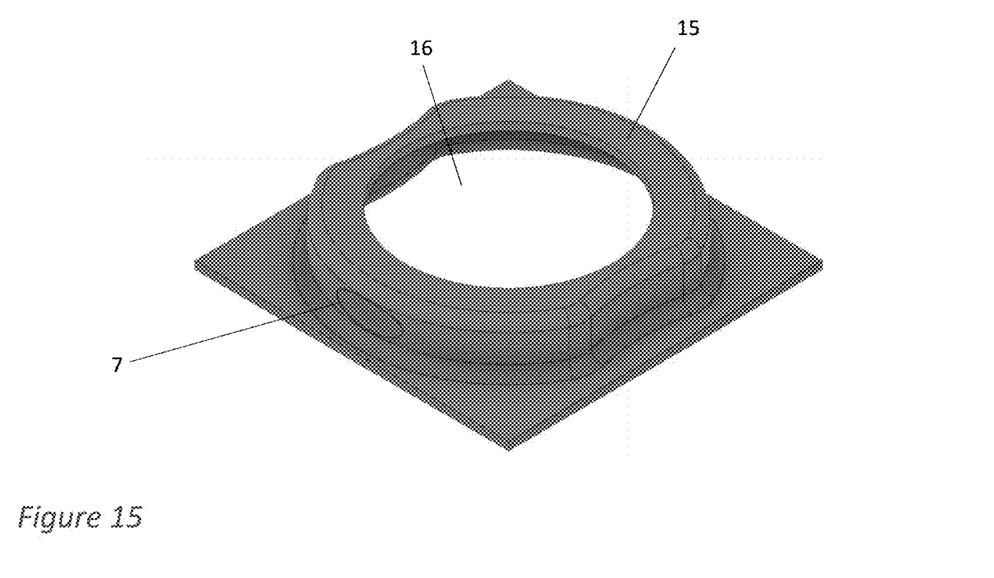
FIG. 15 shows a single projection with a large central hole; and
p.

FIG. 15 shows a variation in which a single large projection 15 is used in place of a pair of projections 5. All features of this single large projection 15 may be the same as for the combination of the pair of projections 5 except that there are no paths 10 to conduct heat into the central region of the projection 15. The single large projection 15 has the advantage of allowing a very large hole 16 to be formed in the top thereof for very efficient transfer of moisture across the structure 1.

Figure 16:
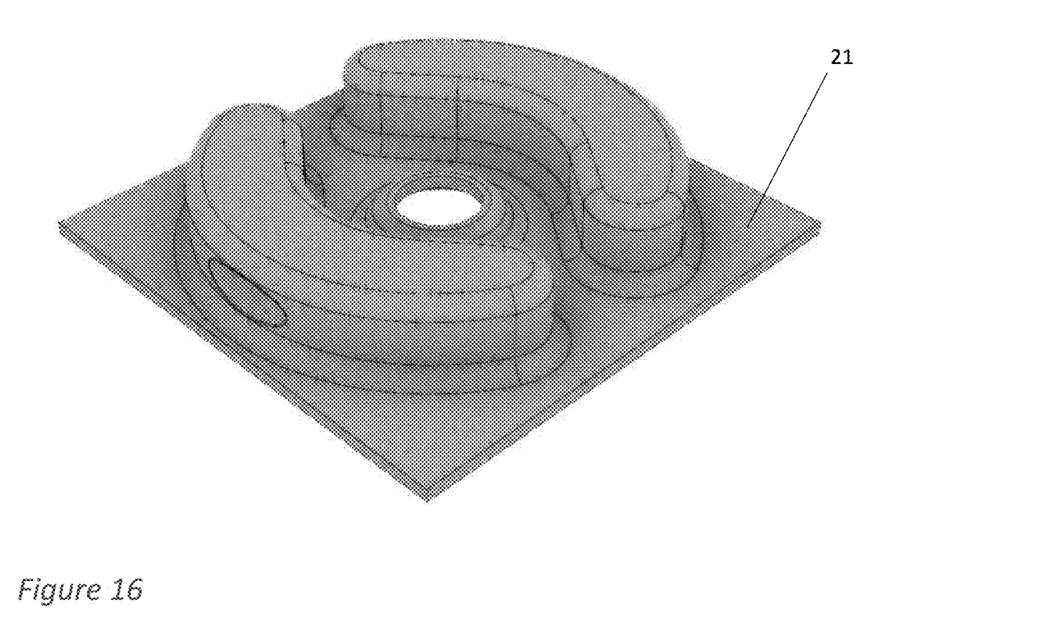
FIG. 16 shows a textured mat.

FIG. 16 shows a textured version of the support structure 21 which is identical to the support structure 1 discussed above except with the addition of a textured upper surface (the surface that contacts the thermal element in use). The texture may be provided by adhering particles such as fibres to the surface of the mat. Fleece fibres are particularly suitable for this texturing and provide a keyed surface for good bonding of adhesive to the mat 21.

It will be appreciated that other variations and modifications may be made to the examples described above while still falling within the scope of the appended claims.

The invention claimed is:

1. A heating system, comprising:
a support structure;
a plurality of projections formed on the support structure; and
at least one electrical heating wire;
wherein the plurality of projections are positioned so as to form a first set of substantially parallel undulating channels, the undulations of each channel being formed by a series of constrictions that are alternately offset in opposite directions along a length of the respective channel, wherein each constriction in the series of constrictions is formed by three projections of the plurality of projections;

wherein each projection of the plurality of projections comprises a side wall having a recess formed therein, the recess facing one of the substantially parallel undulating channels;

wherein each undulation of each channel has an amplitude that does not exceed a width of the respective channel;

wherein the at least one electrical heating wire is configured to be retained within one or more of the substantially parallel undulating channels; and wherein the at least one electrical heating wire undulates back and forth within the one or more of the substantially parallel undulating channels when the at least one electrical heating wire is retained therein.

2. The heating system of claim 1, wherein the plurality of projections also forms a second set of undulating channels, the undulations of each of the second set of undulating channels being formed by a second series of constrictions that are alternately offset in opposite directions along a length of the respective channel.

3. The heating system of claim 2, wherein the first set of undulating channels is substantially perpendicular to the second set of undulating channels.

4. The heating system of claim 3, wherein the first and second sets of undulating channels together encompass a regular rectangular grid.

5. The heating system of claim 1, wherein the at least one electrical heating wire has a diameter of at least 2 mm.

6. The heating system of claim 1, wherein the projections of the plurality of projections are grouped into pairs, the recesses of each pair of projections facing adjacent undulating channels of either the first set of undulating channels or a second set of undulating channels.

7. The heating system of claim 6, where for each pair of projections, each projection of the pair is formed as a curve, the two curves being separated by and partially bordering a central space.

8. The heating system of claim 6, wherein each pair of projections forms a structure that is wider in a first dimension that separates two inner channel diameters than in a second, perpendicular dimension that separates two outer channel diameters.

9. The heating system of claim 6, wherein:
each pair of projections has one of two orientations, one orientation being a ninety degree rotation of the other orientation; and
the pairs of projections are arranged on the support structure in a rectangular grid with the orientations of the pairs of projections set according to a checkerboard pattern.

10. The heating system of claim 1, further comprising a stress mitigation layer on an underside of the support structure.

11. The heating system of claim 10, wherein:
the stress mitigation layer is a fabric stress mitigation layer; and
at least one hole extends through the support structure without penetrating the fabric stress mitigation layer, said at least one hole having a diameter of at least 3 mm.

12. The heating system of claim 11, wherein the at least one hole is formed in a projection of the plurality of projections.

13. The heating system of claim 1, wherein:
each projection of the plurality of projections comprises:
a convex sidewall facing one of the substantially parallel undulating channels,
a concave sidewall opposite the convex sidewall and facing away therefrom, and
a pair of rounded edges connecting the convex sidewall to the concave sidewall; and
each constriction in the series of constrictions is formed by a convex sidewall of one of the three projections and a rounded edge of two of the three projections.

14. The heating system of claim 1 wherein the series of constructions alternates between:
a first configuration in which two of the three projections are on a first side of one of the substantially parallel undulating channels and one of the three projections is on a second, opposite side; and
a second configuration in which one of the three projections is on the first side and two of the three projections are on the second side.

15. The heating system of claim 6, wherein the projections of each pair of projections are separated by a portion of the support structure.

16. The heating system of claim 9, wherein:
in a first one of the two orientations, the pairs of projections form a structure that is wider in a first dimension than in a second, perpendicular dimension; and
in a second one of the two orientations, the pairs of projections form a structure that is wider in the second dimension than in the first dimension.

17. A heating system, comprising:
a support structure;
a plurality of projections formed on the support structure; and
at least one electrical heating wire;
wherein the plurality of projections are positioned so as to form a first set of substantially parallel undulating channels, the undulations of each channel being formed by a series of constrictions that are alternately offset in opposite directions along a length of the respective channel, wherein each constriction in the series of constrictions is formed by three projections of the plurality of projections;
wherein each projection of the plurality of projections comprises
a convex sidewall having a recess formed therein, the recess facing one of the substantially parallel undulating channels; and
a concave sidewall opposite the convex sidewall and facing away therefrom;
wherein each undulation of each channel has an amplitude that does not exceed a width of the channel;
wherein the at least one electrical heating wire is configured to be retained within one or more of the substantially parallel undulating channels; and
wherein the at least one electrical heating wire undulates back and forth within the one or more of the substantially parallel undulating channels when the at least one electrical heating wire is retained therein.

18. The heating system of claim 17, wherein each projection of the plurality of projections further comprises a pair of rounded edges connecting the convex sidewall to the concave sidewall.

19. A heating system, comprising:
a support structure;
a plurality of projections formed on the support structure; and
at least one electrical heating wire;
wherein the plurality of projections are positioned so as to form a first set of substantially parallel undulating channels, the undulations of each channel being formed by a series of constrictions that are alternately offset in opposite directions along a length of the respective channel, wherein each constriction in the series of constrictions is formed by three projections of the plurality of projections;
wherein each projection of the plurality of projections comprises a side wall having a recess formed therein, the recess facing one of the substantially parallel undulating channels;
wherein the projections of the plurality of projections are grouped into pairs, the recesses of each pair of projections facing adjacent undulating channels of either the first set of undulating channels or a second set of undulating channels;
wherein the projections of each pair of projections are separated by a portion of the support structure;
wherein each undulation of each channel has an amplitude that does not exceed a width of the channel;
wherein the at least one electrical heating wire is configured to be retained within one or more of the substantially parallel undulating channels; and
wherein the at least one electrical heating wire undulates back and forth within the one or more of the substantially parallel undulating channels when the at least one electrical heating wire is retained therein.

* * * * *